(12) United States Patent
Li et al.

(10) Patent No.: US 10,218,758 B2
(45) Date of Patent: *Feb. 26, 2019

(54) SMART PRE-FETCHING FOR PEER ASSISTED ON-DEMAND MEDIA

(71) Applicant: MICROSOFT TECHNOLOGY LICENSING, LLC, Redmond, WA (US)

(72) Inventors: Jin Li, Bellevue, WA (US); Cheng Huang, Redmond, WA (US); Keith W. Ross, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 973 days.

This patent is subject to a terminal disclaimer.

(21) Appl. No.: 14/460,660

(22) Filed: Aug. 15, 2014

(65) Prior Publication Data
US 2015/0012662 A1 Jan. 8, 2015

Related U.S. Application Data

(63) Continuation of application No. 11/678,268, filed on Feb. 23, 2007, now Pat. No. 8,832,290.

(51) Int. Cl.
*G06F 13/00* (2006.01)
*H04L 29/06* (2006.01)
(Continued)

(52) U.S. Cl.
CPC .............. *H04L 65/60* (2013.01); *H04L 47/70* (2013.01); *H04L 47/722* (2013.01);
(Continued)

(58) Field of Classification Search
CPC . H04L 12/5695; H04L 47/722; H04L 47/805; H04L 65/4084; H04L 65/60;
(Continued)

(56) References Cited

U.S. PATENT DOCUMENTS

| 6,839,769 B2 * | 1/2005 | Needham | .............. H04L 67/104 709/243 |
| 8,645,553 B2 * | 2/2014 | Needham | ............ G06F 17/3002 709/227 |

(Continued)

*Primary Examiner* — Kenneth R Coulter
(74) *Attorney, Agent, or Firm* — Alleman Hall Creasman & Tuttle LLP

(57) ABSTRACT

A "Media Sharer" operates within peer-to-peer (P2P) networks to provide a dynamic peer-driven system for streaming high quality multimedia content, such as a video-on-demand (VoD) service, to participating peers while minimizing server bandwidth requirements. In general, the Media Sharer provides a peer-assisted framework wherein participating peers assist the server in delivering on-demand media content to other peers. Participating peers cooperate to provide at least the same quality media delivery service as a pure server-client media distribution. However, given this peer cooperation, many more peers can be served with relatively little increase in server bandwidth requirements. Further, each peer limits its assistance to redistributing only portions of the media content that it also receiving. Peer upload bandwidth for redistribution is determined as a function of surplus peer upload capacity and content need of neighboring peers, with earlier arriving peers uploading content to later arriving peers.

20 Claims, 4 Drawing Sheets

(51) Int. Cl.
*H04L 12/925* (2013.01)
*H04L 12/927* (2013.01)
*H04L 29/08* (2006.01)
*H04L 12/911* (2013.01)

(52) U.S. Cl.
CPC ........ *H04L 47/805* (2013.01); *H04L 65/4084* (2013.01); *H04L 67/104* (2013.01); *H04L 67/28* (2013.01); *H04L 67/2847* (2013.01); *H04L 67/108* (2013.01); *H04L 67/1091* (2013.01)

(58) Field of Classification Search
CPC ... H04L 67/2847; H04L 67/28; H04L 67/104; H04L 67/1091; H04L 67/108; H04L 47/70
USPC ................ 709/231, 232, 234–236, 230, 226; 725/94, 87
See application file for complete search history.

(56) References Cited

U.S. PATENT DOCUMENTS

| | | | | |
|---|---|---|---|---|
| 8,832,290 | B2* | 9/2014 | Li | H04L 12/5695 709/205 |
| 8,850,040 | B2* | 9/2014 | Needham | G06F 17/3002 709/227 |
| 8,904,456 | B2* | 12/2014 | Shen | H04N 7/17318 725/100 |
| 2002/0188735 | A1* | 12/2002 | Needham | G06F 17/30209 709/229 |
| 2007/0204321 | A1* | 8/2007 | Shen | H04N 7/17318 725/135 |
| 2009/0198822 | A1* | 8/2009 | Needham | G06F 17/3002 709/229 |
| 2010/0106778 | A1* | 4/2010 | Needham | G06F 17/30209 709/204 |

* cited by examiner

SMART PRE-FETCHING FOR PEER ASSISTED ON-DEMAND MEDIA

CROSS-REFERENCE TO RELATED APPLICATIONS

This application is a Continuation of U.S. patent application Ser. No. 11/678,268, now U.S. Pat. No. 8,832,290, filed on Feb. 23, 2007, and entitled "SMART PRE-FETCHING FOR PEER ASSISTED ON-DEMAND MEDIA."

BACKGROUND

Technical Field

The invention is related to peer-to-peer (P2P) file sharing, and in particular, to a system and method for P2P file sharing that enables on-demand multimedia streaming while minimizing server bandwidth requirements.

Related Art

Video-on-demand (VoD), also referred to as on-demand video streaming, has become an extremely popular service on the Internet. For example, the well known "YouTube.com," web site states that it currently serves approximately 100 million videos per day to visiting client computers, with nearly 20 million unique visitors per month. Other examples of major Internet VoD publishers include MSN® Video, Google® Video, Yahoo® Video, CNN®, and a plethora of other VoD sites.

Much of the VoD being streamed over the Internet today is encoded in the 200-400 Kbps range. At these rates, Internet Service Providers (ISPs) or Content Delivery Networks (CDNs) typically charge video publishers on the order of about 0.1 to 1.0 cent per video minute. Consequently, serving millions of videos to millions of viewers can result in server bandwidth costs reaching millions of dollars per month. Unfortunately, these costs are expected to increase as demand increases and as higher-quality videos (e.g., videos with rates up to 3 Mbps or more) are made available for download.

Consequently, several peer-to-peer (P2P) based schemes have been suggested or implemented in an attempt to limit server bandwidth requirements in order to control the escalating bandwidth costs. In general, a peer-to-peer (P2P) network is a network that relies on the computing power and bandwidth of participant peers rather than a few large servers. The basic idea of peer-to-peer (P2P) networks is to allow each peer in the network to directly share individual files, and/or to assist a server in distributing either individual files or streaming media content. As is well known to those skilled in the art, there are a large number of conventional approaches to implementing P2P networks.

Most peer-assisted VoD belongs to the category of the single video approach where cooperating peers help to deliver parts of a single video at any given time, rather than parts of multiple videos, and where each peer may be at a different point in the playback of the video. In contrast, live streaming of videos, where all peers are at the same point in the video playback are often based on application-level multicast (ALM) protocols for media streaming. In particular, in these ALM-based schemes, the peer nodes are self organized into an overlay tree over an existing IP network. The streaming data is then distributed along the overlay tree. The cost of providing bandwidth is then shared amongst the peer nodes, thereby reducing the bandwidth burden (and thus dollar cost) of running the media server. However, one problem with such schemes is that the leaf nodes of the distribution tree only receive the streaming media and do not contribute to content distribution. Several related conventional schemes address some of the aforementioned content distribution limitations of generic ALM-based schemes by using multiple distribution trees that span the source and the peer nodes. Each "tree" can then transmit a separate piece of streaming media. As a result, all peer nodes can be involved in content distribution.

A somewhat related conventional P2P media streaming solution uses a "cache-and-relay" approach such that peer nodes can serve clients with previously distributed media from its cache. Yet another P2P-based scheme combines multiple description coding (MDC) of video and data partitioning, and provides a VoD system with a graceful quality degradation as peers fail (or leave the network) with a resulting loss of video sub-streams. Still another P2P-based VoD scheme has applied network coding theory to provide a VoD solution.

In contrast to the single video approach, some conventional P2P-based schemes do support a multi-video VoD approach. For example, one such scheme uses erasure resilient coding (ERC) to partially cache portions of a plurality of previously streamed videos, with the proportion of the media cached by each peer being proportional to the upload bandwidth of the peer. The peers then serve portions of their cached content to other peers to assist in on-demand streaming of multiple videos.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Media Sharer," as described herein, operates within a peer-to-peer (P2P) network to provide a unique peer-driven system for streaming high quality multimedia content, such as a video-on-demand (VoD) service, to participating peers while minimizing server bandwidth requirements. In general, the Media Sharer provides a peer-assisted framework wherein participating peers assist the server in delivering on-demand media content to later arriving peers. Consequently, peers share content to other "downstream" peers with information flowing from older peers to newer peers in various embodiments. Peers cooperate to provide at least the same quality media delivery service as a pure server-client media distribution, with the server making up any bandwidth shortfall that the peers cannot provide to each other. Peer upload bandwidth for redistribution of content to other peers is determined as a function of both surplus peer upload capacity and content need of neighboring peers.

As noted above, the Media Sharer enables peer-assisted on-demand media streaming. Consequently, the Media Sharer described herein does not actually replace the server (or server farm) which stores the media to be shared to requesting peers. Instead, the server is assisted by the peers so that the responsibilities of the server are generally reduced to: 1) guaranteeing that peers can play the video (or other media) at the highest possible playback rate, while the bulk of that media is actually sent to the peers by other peers; and 2) introducing the peers to each other so that each peer knows which other peers they should serve content to. In other words, as peers come online, and as other peers either go offline or pause the media playback, the server will periodically inform each peer what "neighborhood" each peer belongs to, and their position within that neighborhood.

As a result, each peer will always know what "neighboring peers" it should serve content to.

In the simplest case, peers only download just enough data to meet their media streaming needs. Peers cooperate to assist the server by uploading media content to other downstream peers to meet this minimum demand level. However, since peers may have additional upload capacity left after satisfying the minimum upload demands of their neighbors, in further embodiments, peers pre-fetch data from other peers to fill a "pre-fetching buffer." As a result, peers will have an additional content buffer (i.e., the pre-fetching buffer) from which they will draw content before making demands on the server. As a result, peers are less likely to need to contact the server for content during the streaming session, thereby reducing server load.

In one embodiment, peers act independently to send data to multiple other peers having the smallest pre-fetching buffer levels so that, as a group, the peers try to maintain similar pre-fetching buffer levels in each of their neighboring peers. Since each peer is concerned about the pre-fetching buffer level of its neighboring peers, this embodiment is referred to as a "water-leveling" buffer filling embodiment. Further, in the context of the idea of "water-leveling," the pre-fetching buffer is also referred to herein as a "reservoir." Note that although two or more peers may have identical pre-fetching buffer levels, if those peers joined the P2P network at different times (e.g., they began playback of the requested media at different times), then those peers will be at different playback points in the video stream.

In a related embodiment, each peer acts to fill the reservoir (i.e., the pre-fetching buffer) of its nearest downstream temporal neighbor to a level equal to its own level. In other words, peer 1 will first act to fill the pre-fetching buffer of peer 2, where peer 2 is the closest temporal neighbor to have joined the P2P network after peer 1. Once the pre-fetching buffer level of peer 2 is equal to the level of peer 1, then peer 1 will reduce (but not eliminate) the upload bandwidth to peer 2, and act to fill the buffer level of peer 3, where peer 3 is the closest temporal neighbor to have joined the P2P network after peer 2. In the mean time, peer 2 will also be acting to fill the buffer of peer 3, and so on. Since each peer in this embodiment receives as much of content as possible from its immediate upstream neighbor without caring what the upstream gives to any further downstream neighbors, this embodiment is referred to as a "greedy-neighbor" buffer filling embodiment.

In view of the above summary, it is clear that the Media Sharer described herein provides a unique system and method for enabling peer assisted media streaming that significantly reduces server bandwidth requirements in a P2P network. In addition to the just described benefits, other advantages of the Media Sharer will become apparent from the detailed description that follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
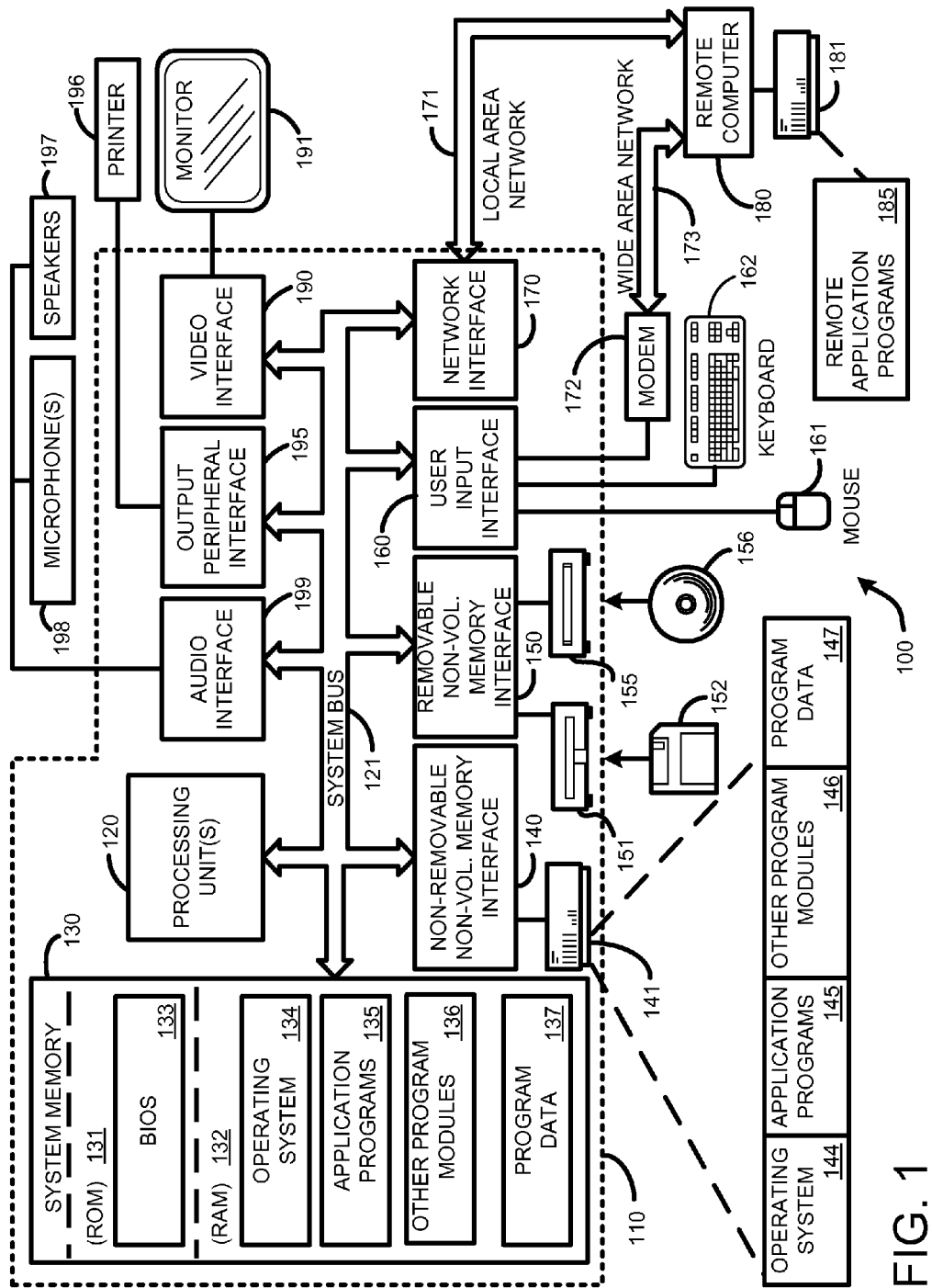
FIG. 1 is a general system diagram depicting a general-purpose computing device constituting an exemplary system implementing a Media Sharer, as described herein.
Figure 2:
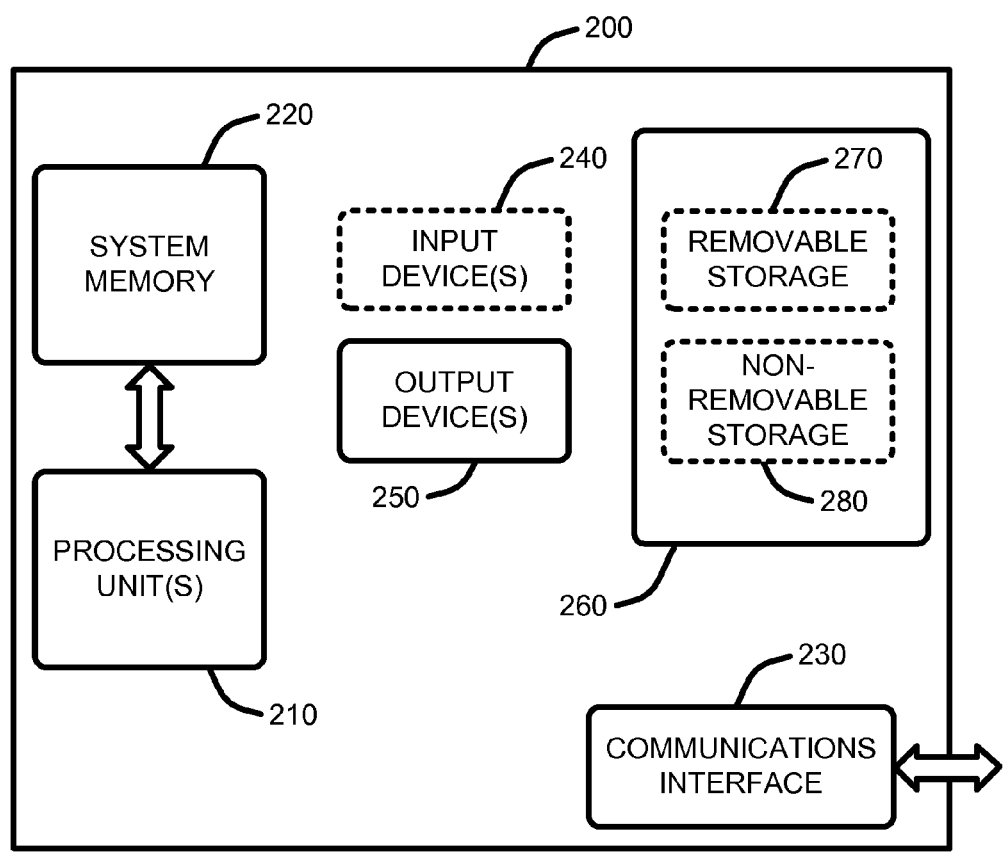
FIG. 2 is a general system diagram depicting a general device having simplified computing and I/O capabilities for use in a P2P enabled by the Media Sharer, as described herein.
Figure 3:
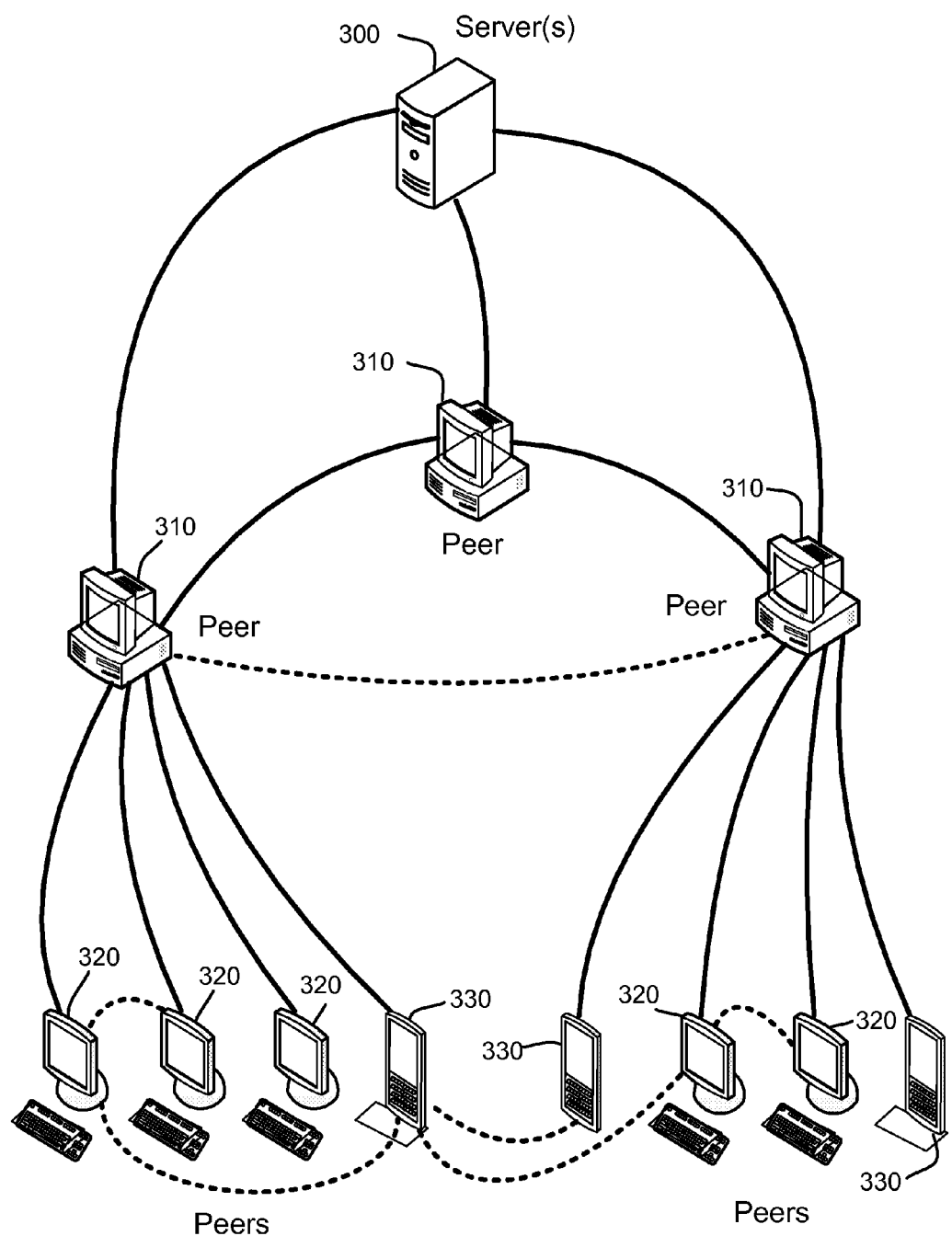
FIG. 3 illustrates one example of a peer-to-peer (P2P) network for use in implementing the Media Sharer, as described herein.

1.0 Exemplary Operating Environment:

FIG. 1 and FIG. 2 illustrate two examples of suitable computing environments on which various embodiments and elements of a Media Sharer, as described herein, may be implemented. In addition, FIG. 3 illustrates a simple example of a P2P network environment within which the Media Sharer operates, as described herein. Note that the use of generic P2P network is described only for purposes of explanation, and that the Media Sharer is capable of operating within any type of P2P network where peers can be given a list of neighboring peers by the server or servers to assist with content delivery, as described in further detail below beginning in Section 2.

For example, FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media such as volatile and nonvolatile removable and non-removable media implemented in any method or technology for storage of information such as computer readable instructions, data structures, program modules, or other data.

For example, computer storage media includes, but is not limited to, storage devices such as RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device. Such computing devices can be typically be found in devices having at least some minimum computational capability in combination with a communications interface, including, for example, cell phones PDA's, dedicated media players (audio and/or video), etc. It should be noted that any boxes that are represented by broken or dashed lines in FIG. 2 represent alternate embodiments of the simplified computing device, and that any or all of these alternate embodiments, as described below, may be used in combination with other alternate embodiments that are described throughout this document.

At a minimum, to allow a device to join the overall P2P network environment to participate in content sharing operations, the device must have some minimum computational capability, some storage capability, and a network communications interface. In particular, as illustrated by FIG. 2, the computational capability is generally illustrated by processing unit(s) 210 (roughly analogous to processing units 120 described above with respect to FIG. 1). Note that in contrast to the processing unit(s) 120 of the general computing device of FIG. 1, the processing unit(s) 210 illustrated in FIG. 2 may be specialized (and inexpensive) microprocessors, such as a DSP, a VLIW, or other micro-controller rather than the general-purpose processor unit of a PC-type computer or the like, as described above.

In addition, the simplified computing device of FIG. 2 may also include other components, such as, for example one or more input devices 240 (analogous to the input devices described with respect to FIG. 1). The simplified computing device of FIG. 2 may also include other optional components, such as, for example one or more output devices 250 (analogous to the output devices described with respect to FIG. 1). Finally, the simplified computing device of FIG. 2 also includes storage 260 that is either removable 270 and/or non-removable 280 (analogous to the storage devices described above with respect to FIG. 1).

The exemplary operating environment having now been discussed, the remaining part of this description will be devoted to a discussion of the program modules and processes embodying a "Media Sharer" which provides on-demand video, or other media or data file, access across a P2P network.

2.0 Introduction:

In a straight server system (i.e., no assistance from peers), the server rate (i.e., the upload bandwidth requirements of the server) is directly proportional to the number of peers requesting streaming media (up to the bandwidth limit of the server). However, given the assistance of peers in serving other peers in the manner enabled by the Media Server, the server rate can be significantly reduced, depending upon the number of peers and a surplus upload capacity of those peers. In fact, the ability to reduce the server rate by very large margins allows the server to provide content encoded at higher bitrates (higher quality) than would otherwise be possible for a given server rate allowance. On the other hand, as described in further detail in Section 3, when the number of concurrent peers is small, the Media Sharer is more likely to run into a temporary deficit state that requires active server participation (and increased bandwidth usage) to serve those peers.

In general, the Media Sharer described herein provides a framework in which peers assist one or more servers in delivering on-demand media content to other peers across a loosely coupled P2P network. In the simplest case, peers only download just enough data to meet their media streaming needs. Peers cooperate to assist the server by uploading media content to other neighboring downstream peers (i.e., later arriving peers) to meet this minimum demand level. However, since peers may have additional upload capacity left after satisfying the minimum upload demands of their neighbors, in further embodiments, peers pre-fetch data from other peers to fill a "pre-fetching buffer," (also referred to herein as a "reservoir"). As a result, peers will have an additional content buffer (i.e., the pre-fetching buffer or "reservoir") from which they will draw content before making demands on the server. As a result, peers are less likely to need to contact the server for content during the streaming session, thereby reducing server load.

Note that while the Media Sharer described herein is applicable for use in large P2P networks with multiple peers, the following description will generally refer to individual peers (or groups of two or more communicating peers) for purposes of clarity of explanation. Those skilled in the art will understand that the described system and method offered by the Media Sharer is applicable to multiple peers, and that it can be scaled to any desired P2P network size or type.

As noted above, the Media Sharer operates within the framework of a generic P2P network. For example, one very simple P2P network is illustrated by FIG. 3. In this type of P2P network, the server(s) 300 are dedicated computers set up for the Media Sharer operation. Basically, the job of the server is to serve media content when needed (to meet any demand not satisfied by other peers), and to introduce peers to each other as neighbors to be served by their fellow neighbors. The peers 310, 320 and 330 are all end-user nodes (such as PC-type computers, PDA's, cell phones, or any other network-enabled computing device) variously connected over the Internet.

In addition, the server 300 also performs various administrative functions such as maintaining a list of available peers, an arrival order (or current playback point) of those peers (for identifying neighboring peers), peer upload capabilities, performing digital rights management (DRM) functionality, etc. Further, some elements of the server 300 operation will vary somewhat depending upon the architecture of the P2P network type used for implementing the Media Sharer. However, as the various types of conventional P2P networks are well known to those skilled in the art, those minor differences will not be described herein as they do not significantly affect the sharing between peers once peers are directed to their neighbors as described in the following sections.

Note that the following discussion will generally refer to communication between two or more peers, which are generically labeled as peer 1, peer 2, etc., for purposes of explanation. However, it should be understood that any given peer in the P2P network enabled by the Media Sharer may be in concurrent contact with a large number of peers that are in turn also in contact with any number of additional peers. Furthermore, the following discussion will also generally refer to video streaming in the context of a VoD service. However, it should be clear that the Media Sharer is capable of operating with any type of on-demand media or other on-demand data that is being shared between peers. In this context, the use of video and VoD is intended to be only one example of the type of content that can be shared.

2.1 System Overview:

In general, the Media Sharer provides a peer-assisted framework wherein participating peers assist the server in delivering on-demand media content (movies, music, audio, streaming data, etc.) to other, later arriving, peers. In this sense, peers act to share content to other "downstream" peers where information "flows" from the "older" peers to the "newer" peers in various embodiments. Peers cooperate to provide at least the same quality media delivery service as a pure server-client media distribution, with the server making up any bandwidth shortfall that the peers cannot provide to each other. However, given this peer cooperation, a very large number of peers can generally be served with relatively little increase in server bandwidth requirements.

In a single media file embodiment, each peer limits its assistance to redistributing only portions of the media content that it is currently receiving. In a related embodiment, each peer maintains a cache of recently viewed media content that may include any number of media files, depending upon the storage space allocated or available to each peer. In this embodiment, each peer redistributes portions of various cached files, depending upon the demands of other peers.

In either case, peer upload bandwidth for redistribution is determined as a function of both surplus peer upload capacity and content need of neighboring peers. However, for purposes of explanation, the following discussion will focus on the single video case where each peer limits its assistance to redistributing only portions of the media content that it is currently receiving. In fact, even where the server is serving multiple videos to multiple peers, if the server treats each set of peers that are requesting a particular video as a unique set of peers, then the distribution of N videos essentially becomes N separate sub-distribution problems, one for each video. Consequently, while the on-demand distribution of a single video (or other content) will be described herein, it should be understood that the discussion applies equally to distribution of many files as a collection of separate distribution problems.

As noted above, the Media Sharer enables peer-assisted on-demand media streaming. Consequently, the Media Sharer described herein does not actually replace the server (or server farm) which stores the media to be shared to requesting peers. Instead, the server is assisted by the peers so that the responsibility of the server is reduced to guaranteeing that peers can play the video (or other media) at the highest available playback rate without any quality degradation, while the bulk of that media is actually sent to the peers by other peers.

In addition, the server (or servers) also "introduces" the peers to each other so that each peer knows which other peers they should serve content to. In other words, as peers come online, and as other peers either go offline or pause their playback, the server will periodically inform each peer what "neighborhood" each peer belongs to. As a result, each peer will always know what "neighboring peers" it should serve content to. However, it should be noted that just because two peers are neighbors, there is no guarantee that they will include the same set of other neighbors.

As noted above, the peer-assisted VoD (or other media streaming) enabled by the Media Sharer operates by having the peers that are viewing a particular video also assist in redistributing that media to other peers. Since peer-assisted VoD can move a significant fraction of the uploading from the server to the peers, it dramatically reduces the server bandwidth costs required to serve multiple peers. Whenever the peers alone cannot fully meet the real-time demands of other peers, the server makes up the difference, so that each peer receives the video at the encoded rate. The server is only active when the peers alone cannot satisfy the demand. When the peers alone can satisfy the demand, not only is the server inactive, but the peers also act to pre-fetch video from each other using any available surplus bandwidth of the other peers. This pre-fetching capability allows the peers to fill a pre-fetching buffer or "reservoir" of video content, which can then be tapped when the aggregate upload bandwidth of peers becomes less than the demand across all peers.

In one embodiment, using surplus upload bandwidth capacity available after the minimum peer demand has been met, peers act independently to send data to one or more neighboring peers having the smallest reservoir levels so that, as a group, the peers try to maintain similar reservoir levels in each of their neighboring peers. Since each peer is concerned about the reservoir level of its neighboring peers, this embodiment is referred to as a "water-leveling" embodiment for filling each peers pre-fetching buffer. Note that although two or more peers may have identical pre-fetching buffer levels, if those peers joined the P2P network at different times (i.e., they requested and began playback of the media at different times) or if one or more of the peers has paused the playback, then those peers will be at different playback points in the video stream, and hence each buffer will have a different buffer point. Note the difference between buffer levels and buffer points is discussed in further detail in Section 3.

In a related embodiment, each peer uses any surplus upload bandwidth capacity to send additional media content to fill the reservoir of its nearest downstream temporal neighbor to a level equal to its own level. In other words, peer 1 will first act to fill the buffer of peer 2, where peer 2 is the closest temporal neighbor to have joined the P2P network after peer 1. Once the buffer level of peer 2 is equal to the buffer level of peer 1, then peer 1 will reduce the upload bandwidth to peer 1, and act to fill the buffer level of peer 3, where peer 3 is the closest temporal neighbor to have joined the P2P network after peer 2. In the mean time, peer 2 will also be acting to fill the buffer of peer 3, and so on. Since each peer in this embodiment receives as much of content as possible from its immediate upstream neighbor without caring what the upstream gives to any further downstream neighbors, this embodiment is referred to as a "greedy-neighbor" buffer filling embodiment.

Both the water-leveling and the greedy-neighbor embodiments act to fill the pre-fetching buffers (or "reservoirs") of neighboring peers using available surplus upload capacity existing after the minimum real-time media demands of peers have been satisfied. The primary difference between the two embodiments is how each peer chooses what neighbor it will assist with supplied content. The job of the server in each case is basically the same—to introduce each peer to its neighbors and let the peers serve each other so that the server can limit its bandwidth requirements. Note however, that at a minimum, the server will generally need to serve the entire media content to at least the first arriving peer. Exceptions to this rule involve the case wherein each peer buffers multiple different media files that have been previously viewed by that peer, in which case the server may not have to provide the entire content to a first arriving peer for a given media streaming session. Further, in this case, the server must also track which peer contains which buffered content, and then match each of those peers as neighbors accordingly. Again, as noted above, for purposes of explanation, the following discussion will focus on the single video case where each peer limits its assistance to redistributing only portions of the media content that it is currently receiving.

Figure 4:
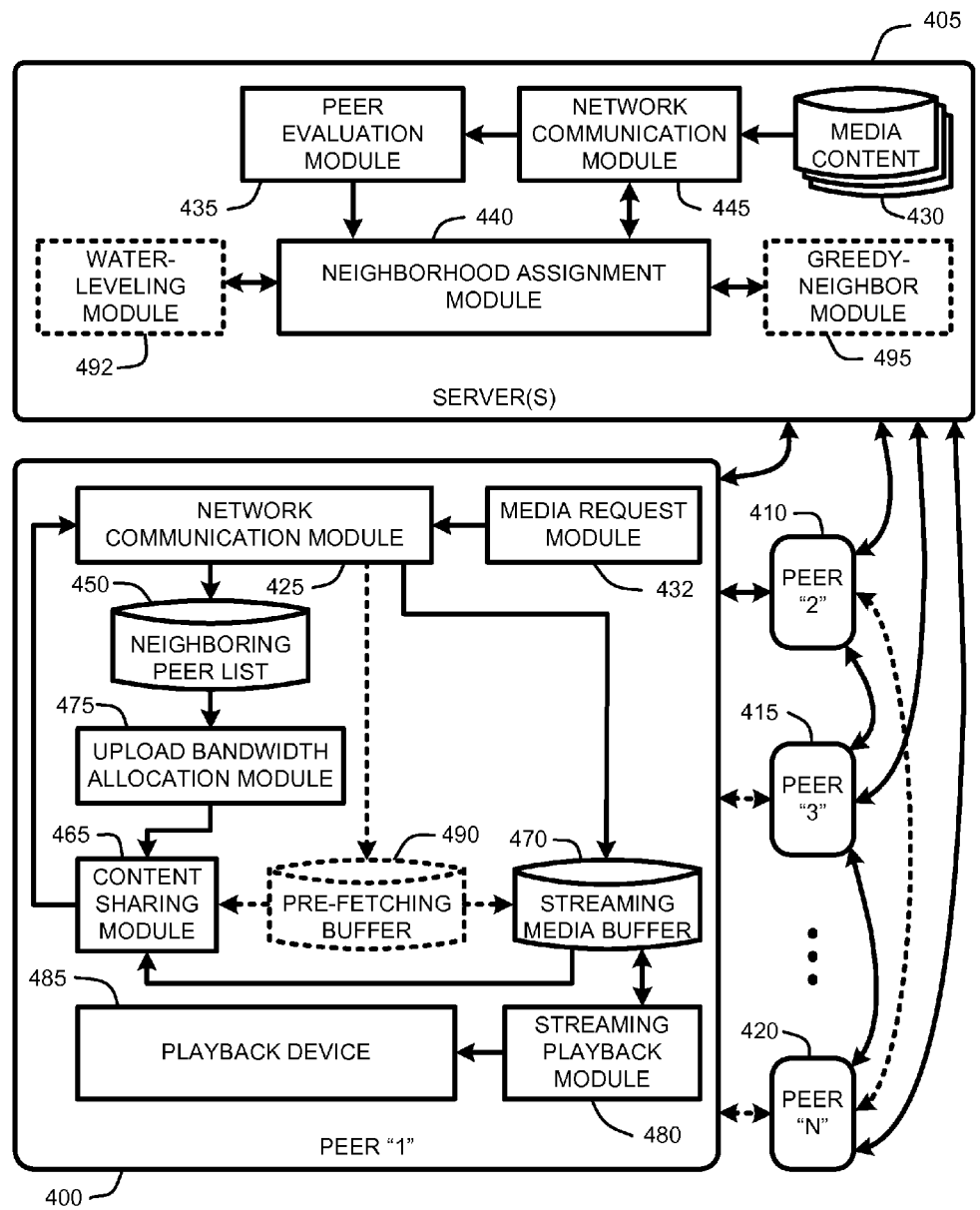
FIG. 4 provides an exemplary architectural flow diagram that illustrates program modules for implementing the Media Sharer, as described herein.

2.2 System Architectural Overview:

The processes summarized above are illustrated by the general system diagram of FIG. 4. In particular, the system diagram of FIG. 4 illustrates the interrelationships between program modules for implementing the Media Sharer, as described herein. It should be noted that any boxes and interconnections between boxes that are represented by broken or dashed lines in FIG. 4 represent alternate embodiments of the Media Sharer described herein, and that any or all of these alternate embodiments, as described below, may be used in combination with other alternate embodiments that are described throughout this document.

Note that for purposes of explanation, the following discussion will generally refer to communication between several peers, which are generically labeled as peer 1 400, peer 2 410, peer 3, 415, and peer N 420. However, it should be understood that any given peer in the P2P network enabled by the Media Sharer may be in concurrent contact with a large number of other peers that are in turn also in contact with any number of additional peers.

In general, as illustrated by FIG. 4, the Media Sharer is enabled by variously connecting a plurality of peers (400, 410, 415 and 420) across a P2P network, such as the network described with respect to FIG. 3. Each of the peers (400, 410, 415, and 420) generally includes the same basic program modules for enabling the Media Sharer. Consequently, for purposes of explanation, rather than reiterating each of those program modules for every peer, FIG. 4 illustrates those modules only for peer 1 400. Peers 2 through N (410, 415, and 420) are understood to include the same program modules as shown for peer 1.

Each time a peer (400, 410, 415, or 420) comes online in the P2P network, it will use a network communication module 425 to connect to server(s) 405 to request particular media content 430 to be served to that peer. Requests for particular content are generated by a media request module 432, such as, for example, a user interface that allows a user to select of otherwise specify the media content 430 to be streamed. At the same time, each peer (400, 410, 415, or 420) will also report its upload bandwidth capabilities to the server 405 so that the server can track the upload capabilities of each peer and assign each peer to a group of one or more neighboring peers. Note that communication across a network using a network communication module or the like is a concept that is well understood to those skilled in the art, and will not be described in detail herein.

The server 405 will then use a peer evaluation module 435 to evaluate the real-time download rate requirements of each peer (400, 410, 415, or 420) for the requested media content 430 in combination with the upload capabilities reported by each peer. The server 405 then uses a neighborhood assignment module 440 to assign each peer to a neighborhood of fellow peers via a server network communication module 445. Note that as described in further detail in section 3, the minimum real-time rate requirements represents the minimum download bandwidth that each peer needs to successfully stream the media content 430 at its encoded resolution.

In general, a first peer 400 contacting the server 405 will be served media content 430 across the P2P network to its network communication module 425 via the server's network communication module 445. As additional peers (e.g., peers 410, 415 and 420) later join the P2P network and contact the server 405 with requests for the media content 430, the server will use the neighborhood assignment module 440 to assign those peers to a set of one or more neighboring peers, and will then periodically send an updated neighboring peers list 450 to each peer. Note that the server 405 periodically updates the neighboring peers list 450 to address the issue of new peers coming online, and existing peers dropping offline or having changed upload capabilities for some reason. Further each peer periodically reports its capabilities and various status parameters (such as playback points, buffer levels, etc.) to the server, for use in creating updated neighboring peer lists 450, as described herein.

As described in further detail in Section 3, the Media Sharer operates to ensure that the media content 430 is served to peers (400, 410, 415, or 420) first from the upload capacity of other peers, and then from the server 405 only if necessary to ensure that the minimum real-time demand of every peer is fully satisfied. Note that as discussed in Section 3, this real-time demand may include a small transmission buffer or the like to account for packet delays and/or transmission losses across the P2P network. This type of buffer is well known to those skilled in the art, and will not be described in detail herein.

In general, peers (400, 410, 415, or 420) act to assist the server by streaming content to their neighboring peers (in accordance with directions included in the neighboring peer list 460 sent by the server 405) by using a content sharing module 465 to pull received data packets of the incoming media content 430 from a streaming media buffer 470. These pulled data packets are transmitted to other downstream (later arriving) peers via the network communication module 425 using an upload bandwidth level that is set via an upload bandwidth allocation module 475 (in accordance with directions included in the neighboring peer list 450 periodically sent by the server 405). At the same time, each peer (400, 410, 415, or 420) will also using a streaming playback module 480 to pull those same data packets from the streaming media buffer 470 for real-time playback of the media content 430 on a local playback device 485. As discussed in further detail in Section 3, the streaming media buffer 470 holds content to meet the minimum real-time demands of the peers (400, 410, 415, or 420).

At any point in time, once the real-time demands of each peer (400, 410, 415, or 420) has been satisfied (for ensuring uninterrupted media playback), one or more of the peers may still have some additional or "surplus" upload capacity that is not being used. Further, the server 405 is fully aware of the surplus upload capacity of the peers (400, 410, 415, or 420) since each peer periodically reports its capabilities and various status parameters (such as playback points, buffer levels, etc.) to the server, for use in creating updated neighboring peer lists 450, as described above.

Therefore, in various embodiments, the Media Sharer acts to use this surplus upload capacity of each peer (400, 410, 415, or 420) to send additional data packets to other peers as a way to allow each of those peers to save up for a possible time in the future when the other peers may not be able to meet the minimum real-time demands of one or more neighboring peers. These additional data packets are transmitted across the P2P network in the same manner as any other data packet. However, since they are not currently needed for real-time playback of the media content 430, the additional data packets are stored in a "pre-fetching buffer" 490, also referred to as a reservoir.

While the additional data packets are transmitted in the same manner as packets needed for real-time demand, the decision as to how much bandwidth each peer (400, 410, 415, or 420) will allocate to the additional data packets, and to which peers that bandwidth will be allocated, is not the same as for meeting the real-time demands of each peer.

For example, in one embodiment, described herein as a "water-leveling" embodiment, the server 405 includes a water-leveling module 492 that includes additional instructions in the neighboring peer list 450 that is periodically sent to each peer (400, 410, 415, or 420). These additional instructions inform each peer (400, 410, 415, or 420) as to how much of its surplus bandwidth it is to allocate, and to which peers it will be allocated, for sending the additional data packets for filling the pre-fetching buffer 490 of one or more neighboring peers.

As described in Section 3.4, the water-leveling module 492 determines allocation levels for surplus bandwidth by performing a three-step process that includes: 1) evaluating all peers (400, 410, 415, or 420) in the order of their arrival in the P2P network to determine the required server rate to support real-time playback; 2) evaluating all the peers in reverse order of arrival to assign available peer upload bandwidth to downstream peers as a "growth rate" for each peers pre-fetching buffer 490; and 3) periodically evaluate all the peers again in order of arrival and adjust the growth rates as needed to insure that downstream peers whose pre-fetching buffer point catches up to upstream peers do not continue to receive excess bandwidth allocations. Note that the pre-fetching buffer point of a peer represents the total amount of content downloaded by a peer up to time t, and not the level or amount of content that is actually in the pre-fetching buffer at time t. As such, the pre-fetching buffer point corresponds to a future point in the playback stream of the media file. Note that when the server 405 periodically sends an updated neighboring peer list 475 to the peers, that list includes the periodic updates regarding bandwidth allocation for maintaining the desired growth rate for each peers pre-fetching buffer.

In an alternate embodiment for using the surplus peer (400, 410, 415, or 420) bandwidth, described herein as a "greedy-neighbor" embodiment, the server 405 includes a greedy-neighbor module 495 that includes additional instructions in the neighboring peer list 450 that is periodically sent to each peer. These additional instructions inform each peer (400, 410, 415, or 420) as to how much of its surplus bandwidth it is to allocate, and to which peers it will be allocated, for sending the additional data packets for filling the pre-fetching buffer 490 of one or more neighboring peers.

As described in Section 3.5, the greedy-neighbor module 495 determines allocation levels for surplus bandwidth by performing a two-step process that includes: 1) evaluating all peers (400, 410, 415, or 420) in the order of their arrival in the P2P network to determine the required server rate to support real-time playback; and 2) once the first pass through the peers has been completed, in a periodic second step, the greedy-neighbor module passes through all peers in order again, and then allocates as much bandwidth as possible from each peer to the next arriving neighboring peer. However, as with the water-leveling module 492, the greedy-neighbor module 495 also acts to insure that the pre-fetching buffer point of a downstream peer does exceed that of the peer supplying it with additional data packets. Note that when the server 405 periodically sends an updated neighboring peer list 475 to the peers, that list includes the periodic updates regarding bandwidth allocations for filling each peers pre-fetching buffer 490.

3.0 Operation Overview:

The above-described program modules are employed for implementing the Media Sharer. As summarized above, the Media Sharer provides a peer-assisted framework wherein participating peers assist the server in delivering on-demand media content. The following sections provide a detailed discussion of the operation of the Media Sharer, and of exemplary methods for implementing the program modules described in Section 2 with respect to FIG. 4.

3.1 Operational Details of the Media Sharer:

The following paragraphs detail specific operational and alternate embodiments of the Media Sharer described herein. In particular, the following paragraphs describe details of the Media Sharer operation, including: generic surplus and deficit bandwidth operational modes; peer-assisted content delivery with no pre-fetching; peer-assisted content delivery with water-leveling based pre-fetching; and peer-assisted content delivery with greedy-neighbor based pre-fetching.

In general, as discussed in the following paragraphs, embodiments that do not make use of surplus peer bandwidth for pre-fetching content have been observed to provide significant server load reductions in both high-surplus and high-deficit operational modes. However, in cases where the average peer bandwidth supply approximately equals the average demand (i.e., a balanced operational mode), pre-fetching becomes necessary for reducing server load. In particular, assuming a relatively low peer arrival rate, the P2P network will tend to fluctuate between instantaneous surplus and instantaneous deficit states in an approximately balanced system.

In tested embodiments, it has been observed that the two pre-fetching embodiments described below can result in dramatically lower average server rates. For example, in the perfectly balanced mode, pre-fetching can reduce the average server rate by a factor of five or more. In the surplus modes, the server rate actually goes to 0 when peers are allowed to pre-fetch content from upstream peers. The pre-fetching buffer built up during the surplus state allows the Media Sharer system to sustain streaming without using the server bandwidth at all. In a deficit system, the server rate is much closer to the bound D−S. This is true in both the water-leveling embodiment and the greedy-neighbor embodiment. Moreover, the greedy-neighbor embodiment appears to achieve slightly lower server rates than the water-leveling embodiment under all the examined conditions. These concepts are discussed in detail in Sections 3.2 through 3.5.

3.2 Surplus and Deficit Bandwidth Operational Modes:

In general, peer assistance in delivering streaming media content to other peers operates in one of three possible modes: 1) a mode in which there is a surplus supply of peer upload bandwidth capacity relative to the current content demands of the peers; 2) a mode in which there is a deficit supply of peer upload bandwidth capacity relative to the current content demands of the peers; and 3) a balanced mode in which the upload bandwidth capacity of the peers is approximately the same as the content demands of the peers.

In general, in providing on-demand media, the length of the media being served (in seconds) can be denoted by T and the encoding rate of the media can be denoted by r (in bps). Further, it is assumed that peers arrive (i.e., contact the server with a request for the media) in some probabilistic distribution, such as, for example, a generally Poisson peer arrival process denoted by $\lambda$. Further, since various peers will have different upload bandwidth capabilities, typically as a function of their Internet service provider (ISP), the total number peer "types" will be denoted by M, with the peer type m corresponding to an upload bandwidth $u_m$ of each peer. Further, each such peer type m is assumed to appear with probability $p_m$.

Consequently, using the property of the compound Poisson process, the peer arrival model described above is the same as if each type m peer arrives in a Poisson process with independent parameter $p_m\lambda$. Therefore, the average upload bandwidth $\mu$ of all peers is given by $\mu=\Sigma p_m u_m$.

It follows from the well known "Little's Law" that in steady state the expected number of type m peers in the system is given by $\rho_m=p_m\lambda T$ since in conventional queuing theory, Little teaches that the average number of elements arriving in a stable system (over some time interval), T, is equal to the average arrival rate of those elements (in this case peers), $\lambda$, multiplied by the average time in the system (in this case the length of the requested media), T. Therefore, assuming a steady state process, the average demand is $D=r\Sigma\rho_m=r\lambda T$, and the average supply $S=\Sigma u_m \rho_m=\mu\lambda T$.

Given this model, the Media Sharer is considered to be operating in a "surplus mode" if S>D; and in a "deficit mode" if S<D. In other words, the Media Sharer is in the surplus mode if $\mu>r$, and in the deficit mode otherwise. It is important to note that even if the Media Sharer is operating in surplus mode, at any given instant of time, the server may still need to be active in supplying media to one or more of the peers for at least two reasons. First, although, on average, the Media Sharer may be in the surplus mode, due to inherent system fluctuations, at any given instant of time the supply may become less than the demand. Second, it may not be possible to use all of the supply bandwidth of the peers at any given instant of time. This second point is discussed in further detail with respect to the different pre-fetching strategies discussed in Section 3.4 and 3.5.

3.3 Peer-Assisted Content Delivery with No Pre-Fetching:

For purposes of explanation, the most basic peer-assistance scenario will be described for the case where there is no pre-fetching of content by peers. In this case, peers only download content in real-time (e.g., the download rate equals r) and do not pre-fetch for future needs. Note that whether or not pre-fetching is used, a download buffer of some size can also be used by the peers to insure that packet losses or delays do not result in an unduly corrupted or unrecoverable media signal. The use of such buffers with respect to media streaming is well known to those skilled in the art, and will not be described in further detail herein. However, it is important to note that the pre-fetching techniques described herein are not equivalent to the use or operation of conventional download buffers. This point will be better understood by reviewing the discussion of the various pre-fetching techniques provided below in Sections 3.4 and 3.5.

Therefore, assuming no pre-fetching, at any particular instant of time there will be n peers in the overall Media Sharer system. These n peers are then ordered so that peer n is the most recent to arrive, peer n-1 is the next most recent, and so on. Thus, peer 1 has been in the system the longest. Let $u_j$, $j=1, \ldots, n$, be the upload bandwidth of the $j^{th}$ peer and its probability be $p(u_j)$. As noted above, peer j is of type m with probability $p_m$, so $p(u_j=u_m)=p_m$. Further let the state of the Media Sharer system be $(u_1, u_2, \ldots, u_n)$ and the rate required from the server be $s(u_1, u_2, \ldots, u_n)$. Since there is no pre-fetching in this example, the demand of peer 1 can only be satisfied by the server, which is the media rate r. Then, the demand of peer 2 will be satisfied first by peer 1 and then the server only if $u_1$ is not sufficient. Similarly, the demand of peer 3 is satisfied first by peer 1, then peer 2, and then the server, and so on. In other words, for n=1, $s(u_1)=r$, and for n=2, $s(u_1, u_2)=r+\max(0, r-u_1)$. Therefore, for a given state, the upload rate required from the server is given be Equation (1), where:

$$s(u_1, u_2, \ldots, u_n) = \max_{1\leq j\leq n}\left(r + \max\left(0, (j-1)r - \sum_{i=1}^{j-1} u_i\right)\right)$$

Note that in accordance with Equation (1), the upload bandwidth of the most recent peer (peer n) is not utilized. Furthermore, if $u_{n-1}>r$, the upload bandwidth portion $u_{n-1}-r$ of the next most recent peer n-1 is also wasted since it can only upload to peer n. Alternatively, if each peer adopts a sharing window and can tolerate a slight delay, then peers arriving very close in time (e.g., peers n, n-1, . . . , n-k, for some k) can potentially upload different content blocks in their windows to each other. Then, every peers upload bandwidth could be fully utilized.

For a Poisson distribution peer arrival, it can be shown that the average additional server rate needed is given by Equation (2), where $$s = \sum_n \frac{(\lambda T)^n}{n!} e^{-\lambda T} \sum_{u_j} p(u_1, u_2, \ldots, u_n) s(u_1, u_2, \ldots, u_n)$$

and where $$p(u_1, u_2, \ldots, u_n) = \prod_{1\leq j\leq n} p(u_j)$$

Although this result is not in closed form, s can be readily calculated using a conventional Monte Carlo summation.

3.3.1 Surplus Peer Upload Capacity:

Given the framework described in Section 3.3, two parameters of the Media Sharer can be determined: 1) the server rate with respect to the supply-demand ratio; and 2) the server rate with respect to the system scale (i.e., the number of peers). For purposes of explanation, the following example will assume that there are only two types of peers operating within the P2P network enabled by the Media Sharer. In particular, it will be assumed that a "type 1" peer has an upload bandwidth of $u_1$, and a "type 2" peer has an upload bandwidth of $u_2$, with the media rate r and the length of the media T.

In this case, it has been observed that when the total peer upload capacity, or supply S, is greater than the demand D by a substantial margin (e.g., S/D is on the order of about 1.4 or more), the server upload rate is very close to the media bit encoding rate r and does not increase as the system scales (i.e., as the number of peers grows). In other words, when there is sufficient average surplus in the system, an approach as simple as the no pre-fetching case can be adopted and the server rate will remain very low.

Further, even with a relatively small average surplus S, the no pre-fetching approach still significantly reduces the server rate. For example, when S/D is on the order of around 1.04, and the number of concurrent peers is around 30,000, it has been observed that the server rate is on the order of about 3.8 r. Compared to traditional client-server models, where the server streams all data and thus its rate would be about 30,000 r, the bandwidth saving is clearly very significant at an almost 8,000 times reduction in server rate. However, the server rate will increase significantly as S/D approaches 1 (i.e., a balanced system). Consequently, while the simple no pre-fetching embodiment can significantly reduce server bandwidth requirements for a "surplus" operating mode, it provides less benefit when the Media Sharer operates closer to a balanced system.

3.3.2 Deficit Peer Upload Capacity:

As noted above, a "deficit" operational state exists when the supply of peer upload bandwidth capacity is less than the current content demands of the peers, i.e., when S<D. In the no pre-fetching case, it has been observed that when the supply S is less than the demand D by a substantial margin e.g., D/S is on the order of about 1.4 or more), the server rate almost always equals to D−S. This means when the Media Sharer is in this high-deficit mode (in the non pre-fetching case), the server rate is again very low relative to the number of peers are being served (compared to the traditional client-server model). Further, it has been observed that the server rate deviates from D−S as D/S approaches 1 (i.e., a balanced system). In addition, it has also been observed that the gap between the server rate and the bound D−S shrinks as the number of peers in the system increases. However, if the absolute value between the server rate and D−S is considered as the number of peers increases, the server rate is not negligible.

In summary, the no pre-fetching operational case performs very well in both high-surplus and high-deficit modes. Unfortunately, the pre-fetching operational case does not perform well in the balanced mode, where the average supply is approximately equal to the average demand. Since media streaming in a P2P network is likely to frequently operate near a balanced mode, additional embodiments of the Media Sharer have been adapted to reduce server upload bandwidth near the balanced operational mode. These additional embodiments, as described in Section 3.4 and 3.5 make use of various pre-fetching techniques to reduce server rate requirements.

3.4 Peer-Assisted Delivery with "Water-Leveling" Based Pre-Fetching:

As discussed above, the performance deviation from the bound in the balanced mode reveals a fundamental limitation of the no pre-fetching operational case. Further, due to the arrival/departure dynamics of many peers operating within the P2P network at any particular point in time, at any given time, even a balanced system (on average) might be instantaneously in a surplus or deficit state.

Further, as discussed above, when the Media Sharer operates in a surplus operational state, the no pre-fetching mode does not use surplus peer upload bandwidth that might be available. In addition, when the Media Sharer enters a deficit operational state, the server needs to supplement the uploading efforts of the peers in order to satisfy the real-time demands of the peers as a group. Consequently, if peers pre-fetch media content before it is needed, the server rate contribution can be reduced since temporary operational states that would otherwise force the server to increase its upload rate are reduced or eliminated by drawing from pre-fetched content rather than calling the server for that content.

In the first pre-fetching embodiment, peers pre-fetch content and buffer data for their future needs, and act in cooperation to keep the pre-fetching buffer level of all neighboring peers as equal as possible. This embodiment, as described in further detail below is referred to as a "water-leveling" buffer filling embodiment. One caveat of this water-leveling embodiment is that in order to keep the server rate low, peers are not permitted to pre-fetch content from the server. In fact, each peer only pre-fetches content from other neighboring peers that arrived before it and that have sufficient upload bandwidth for distribution. As noted above, one thing that the server does do here is to inform each peer of its neighboring peers. Further, since peers may drop offline, or pause their playback, in one embodiment, the server periodically refreshes the list of neighboring peers that is provided to each of the peers in the P2P network.

Whenever a peer has pre-fetched content in its pre-fetching buffer, it can drain that buffer before it requests any new data. Consequently, the current demand of each peer can vary depending on its pre-fetching buffer level, as opposed to the constant demand that exists in the case where no pre-fetching is used. Again, it must be noted that this pre-fetching buffer (also referred to herein as a "reservoir") is not the same as a conventional download buffer used to insure that network packet losses or delays do not result in an unduly corrupted or unrecoverable media signal. Further, in view of the following description, it should be clear that the manner in which the pre-fetching buffer is filled by neighboring peers differs significantly from conventional download buffers.

In particular, in the water-leveling embodiment, $p_i(t)$, $d_i(t)$ and $b_i(t)$, are defined as the current playback point of peer i, the current demand of peer i (relative to demands on the server to provide content), and the current pre-fetching buffer point of peer i at time t, respectively. Note that the pre-fetching buffer point $b_i(t)$ represents the total amount of content downloaded by peer i up to time t, and not the level or amount of content that is actually in the pre-fetching buffer at time t. As such, the pre-fetching buffer point corresponds to a future point in the playback stream of the media file. In this embodiment, the Media Sharer ensures that the pre-fetching buffer points of all peers follow the arrival order of each peer, such that $b_i \geq b_j$ for all i<j. Note that the pre-fetching buffer level, $B_i(t)$, is defined as $B_i(t)=b_i(t)-p_i(t)$. Note that each peer must maintain $B_i(t)>0$, in order ensure continuous real-time playback of the streaming media from content provided by other peers. Consequently, the demand $d_i(t)$ of peer i is 0 (no server requests), if its pre-fetching buffer level $B_i(t)>0$, and r if its pre-fetching buffer level $B_i(t)=0$.

Therefore, if all peers maintain their pre-fetching buffer level $B_i(t)$ above 0, the server rate would be 0 at time t, as the demands of all peers are 0 at the moment. This clearly suggests that the server rate can be significantly reduced if all peers act to accumulate a high pre-fetching buffer level whenever the system is operating in a "surplus" mode, as described above. Consequently, by treating the pre-fetching buffer of every peer as a "water tank" or "reservoir," the water-leveling embodiment described herein operates to fill the lowest tank first.

In particular, the water-leveling embodiment of the Media Sharer ensures that each peer directs its upload resources to the neighboring peer having the lowest pre-fetching buffer level. However, as noted above, each peer only assists those peers that are downstream, i.e., peers only assist later arriving peers (or peers that are effectively later by virtue of pausing the playback of the media). Peers do not assist earlier arriving peers. Given these constraints, the water-leveling embodiment is implemented by a series of steps that includes: first satisfying real-time demands of peers; then allocating pre-fetching buffer growth rates of various peers based on which peers currently have the lowest pre-fetching buffer levels; and then adjusting the pre-fetching buffer growth rates of various peers as those pre-fetching buffers begin to fill from the assistance of other peers. These basic steps are described in the following sections.

3.4.1 Satisfying Real-Time Demands:

At some time t, assume there are n neighboring peers in the P2P network. The demand of each peer is either 0 or r, depending upon whether or not each peer has a non-zero pre-fetching buffer level, as described in Section 3.4. As with the no pre-fetching embodiment described above, the server of the Media Sharer evaluates all peers in a first pass based on their arrival order to determine the required maximum server rate needed to satisfy each individual peer's demand level. These real-time demands are then satisfied either by the server, by the server with partial assistance from the other peers, or entirely by other peers, depending upon whether the P2P network is operating in a deficit mode, a surplus mode, or a balanced mode. This ensures all real-time demands are satisfied. However, at the same time that the demand requirements of each peer are determined at the server, the server is also recording how much upload bandwidth remains at each peer (as reported to the server by each peer). This remaining upload bandwidth capacity of each peer is denoted by $l_i$.

3.4.2 Allocating Growth Rates:

After the first pass through all peers in the water-leveling embodiment, the Media Sharer allocates the remaining upload bandwidth first to peers with smallest pre-fetching buffer levels (as reported by each peer to the server). Clearly, since peers only assist downstream peers, $l_{n-1}$ (i.e., the remaining bandwidth capacity at peer n−1) can only be allocated to peer n, while $l_1$ (i.e., the remaining bandwidth capacity at peer 1) can be allocated to any peers from 2 to n. Therefore, in order to address this asymmetry, in one embodiment, the allocation of the remaining upload bandwidth of peer is performed in a backwards sweep, from node n−1 to node 1. Again, there is no peer later than peer n (i.e., no downstream peers), so its remaining upload bandwidth is not utilized.

The growth rate $g_i$ for each peers pre-fetching buffer represents the additional upload bandwidth assigned to peer i (from other neighboring peers) beyond satisfying the real-time demand of peer i. For example, starting with peer n−1, the remaining upload bandwidth of peer n−1 (i.e., $l_{n-1}$) is assigned to the growth rate $g_n$ of peer n, i.e., $g_n = l_{n-1}$, as long as the buffer point of peer n−1, is ahead that of peer n, i.e., as long as $b_{n-1} > b_n$.

Then, peer n−2 is examined. The allocation of bandwidth for peer n−2 is be calculated as illustrated by Equation (3), where:

$$\begin{cases} g_{n-1} = l_{n-2}, & B_{n-1} < B_{n-2}, \\ g_{n-2} = g_{n-2} + l_{n-2}, & B_{n-1} > B_{n-2}, \\ g_{n-1} = \min\left(\frac{l_{n-2} + g_{n-2}}{2}, l_{n-2}\right), & B_{n-1} = B_{n-2}, \\ g_{n-2} = g_{n-2} + l_{n-2}, \end{cases}$$

In other words, if $B_{n-1} \ne B_n$, then the extra upload capacity, $l_{n-2}$, of peer n−2 is assigned to whichever peer has smaller buffer level. Otherwise, for $B_{n-1} = B_n$, the bandwidth assignment is made to ensure that the growth rate of the peer n−1 and peer n are equal after the allocation.

Next, after the remaining upload bandwidth of peer n−2 is completely assigned to downstream peers, the Media Sharer moves on to allocate the bandwidth of peer n−3 between downstream peers, peer n−2, peer n−1, and peer n in a similar way as described with respect to peer n−2. The Media Sharer then continues this reverse order allocation with peer n−4, and so on, up through peer 1. Note that the entire backward allocation of bandwidth from peer n−1 through peer 1 can be completed in O(n) time, as long as the Media Sharer maintains an auxiliary data structure to keep track of groups containing neighboring peers with the same buffer level.

3.4.3 Adjusting Growth Rates:

The growth rate allocation described in section 3.4.2 is based on each peers pre-fetching buffer levels and the spare upload capacity of the upstream peers. However, since the growth rates of the pre-fetching buffers of the various peers differs, the buffer point, $b_i(t)$, may catch up with the buffer point $b_{i-1}(t)$ of the immediately preceding peer. Again, it should be noted that the buffer point is not the buffer level (i.e., the amount of content in each pre-fetching buffer), but instead represents the total amount of content that has been received by the peer and corresponds to some future point in the playback stream of the media file. In other words, peer k+1 can catch up with peer k such that $b_{k+1}(t) = b_k(t)$ if peer k+1 has a higher growth rate than peer k, such that $g_{k+1} > g_k$ at time (t). If this occurs, then the buffer point of peer k+1 will surpass that of peer k. In this case, the Media Sharer will act to decrease the growth rate $g_{k+1}$ to the same level as $g_k$.

In other words, the third step is to pass through all peers again in order, and reduce the growth rates of those peers who have already caught up with earlier peers. Any excess bandwidth of the neighboring peers is then reassigned to other downstream peers as described in Section 3.4.2. Again, as long as the Media Sharer updates the auxiliary data structure (as described in Section 3.4.2), this growth rate adjustment process can be completed in O(n) time.

In summary, peer bandwidth allocation in the "water-leveling" embodiment includes three steps:

1) Pass through all the peers in order of arrival to determine the required server rate to support real-time playback;
2) Process all the peers in reverse order of arrival to assign available peer upload bandwidth to downstream peers; and
3) Process all the peers again in order of arrival and adjust the growth rates as needed to insure that downstream peers whose buffer point catches up to upstream peers do not continue to receive excess bandwidth allocations. Note that this third step then repeats periodically through the media streaming process.

The complexity of the entire three step bandwidth allocation process is O(n), with the end result of the process being a group of neighboring peers having approximately equal pre-fetching buffer levels, regardless of where each peer is in the playback process. As a result, overall server rate requirements are significantly reduced in the event that the overall P2P network goes into a temporary balanced or deficit operational mode since each of the peers will draw on its pre-fetching buffer rather than call on the server to make up any demand shortfall that cannot be supplied by other peers.

In a tested example of the above-described "water-leveling" pre-fetching buffer filling embodiment, it has been observed that when the server rate is positive, the pre-fetching buffer level, $B_i(t)$, of earliest peers (i.e., peer 1, 2, 3, etc.) is usually 0 at any given time t. This implies that data demands imposed on the server are usually generated by the earliest peers, with those earliest peers relieving some of the data demands on the server by assisting later peers. Due to the asymmetry of the Media Sharer on-demand delivery mechanism, wherein earlier peers only upload content to later peers, the earlier peers are more likely to be assigned lower growth rates than later peers. Therefore, as noted above, the actual behavior of the "water-leveling" embodiment of the Media Sharer system is that later peers tend to have higher buffer levels than earlier peers. Consequently, while the "water-leveling" embodiment produces very good results overall, earlier peers still have a higher risk of running out of buffer, thereby increasing demands on the server. Therefore, in a related embodiment, as described in Section 3.5, the Media Sharer address this issue in a "greedy-neighbor" embodiment wherein each peer simply dedicates its remaining upload bandwidth to the neighboring peer right after itself.

3.5 Peer-Assisted Delivery with "Greedy-Neighbor" Based Pre-Fetching:

The "greedy-neighbor" pre-fetching buffer filling embodiment generally includes two primary steps:

1) The first step is similar to a combination of the no-pre-fetching embodiment and the first step of the "water-leveling" embodiment. In particular, in the "greedy-neighbor" embodiment, the Media Sharer first passes through all peers in order of arrival and determines the server rate needed to satisfy the real-time demands of those peers. As with the "water-leveling" embodiment, the Media Sharer also records the remaining bandwidth at each peer at the same time;

2) Once the first pass through the peers has been completed, in a periodic second step, the Media Sharer passes through all peers in order again, and then allocates as much bandwidth as possible from each peer to the next arriving neighboring peer. However, this second step is repeated periodically so that the growth rate of peer k+1 does not cause the buffer point of peer k+1 to surpass that of peer k, as discussed above with respect to the water-leveling embodiment. In this case, as with the water-leveling embodiment, the Media Sharer will act to decrease the growth rate $g_{k+1}$ to the same level as $g_k$.

The second step can be further explained in the following pseudo code block, which shows that the growth rate of the pre-fetching buffer point (demand+growth rate) is compared between peer k and peer k+1. Consequently, the actual budget for allocating each peer's bandwidth to it neighbor does not need to evaluate the actual buffer level of the neighboring peer, just the buffer point of that neighbor. In particular, this periodic allocation is illustrated by the pseudo code block provided in Table 1:

TABLE 1

Second (Periodic) Step of the "Greedy Neighbor" Embodiment

```
1:  bandwidth allocation := 0
2:  for k = 1 : n − 1 do
3:      bandwidth allocation := bandwidth allocation + l_k;
4:      if b_k = b_{k+1} and d_k + g_k < d_{k+1} + bandwidth allocation
5:          g_{k+1} := d_k + g_k − d_{k+1}
6:      else
7:          g_{k+1} := bandwidth allocation
8:      bandwidth allocation := bandwidth allocation −g_{k+1}
9:  return
```

The foregoing description of the Media Sharer has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Media Sharer. It is intended that the scope of the invention be limited not by this detailed description, but rather by the claims appended hereto.

What is claimed is:

1. A computer-implemented process, comprising:
applying a computer to perform process actions for:
identifying relative times when each of two or more peers in a peer-to-peer (P2P) network requested streaming of a common media file;
directing streaming of media packets of the requested media file to each peer to enable streaming playback of the media file for each peer at different times corresponding to the relative request times from a combination of:
server transmission of streaming packets to one or more of the peers, and
allocation of a first portion of an available upload bandwidth capacity of each peer to transmit one or more received streaming media packets to one or more other peers that requested streaming of the common media file at a later relative request time; and
periodically directing one or more of the peers to allocate a second portion of its available upload bandwidth to transmit additional packets of the common media file to one or more of the peers that requested the common media file at later relative request times.

2. The computer-implemented process of claim 1 further comprising an on-demand service for peer selection of the requested media file from a plurality of available media files.

3. The computer-implemented process of claim 1 further comprising evaluating each of the two or more peers in reverse order of their relative request times and allocating the second portion of each peers available upload bandwidth among a plurality of peers having a later relative request time for filling a pre-fetching buffer of those peers with excess media packets of the requested media file.

4. The computer-implemented process of claim 3 further comprising reducing allocations of the second portions of the upload bandwidth of the peers having earlier relative request times to particular peers having later relative request times when a level of the pre-fetching buffer of those peers reaches that of the peers which are allocating the upload bandwidth.

5. The computer-implemented process of claim 1 wherein periodically directing one or more of the peers to allocate a second portion of its available upload bandwidth comprises:
for each of the two or more peers, identifying a nearest downstream neighbor peer as a particular one of the peers having a closest later relative request time; and
periodically directing each peer to allocate as much upload bandwidth as possible to its nearest downstream neighbor peer for filling a pre-fetching buffer of the nearest downstream neighbor peer with excess media packets of the requested media file.

6. The computer-implemented process of claim 5 further comprising reallocating a portion of the second portion of the upload bandwidth of each peer to a next nearest downstream neighbor peer having a next closest later relative request time when the level of the pre-fetching buffer of the nearest downstream neighbor peer reaches that of the peer which is allocating the upload bandwidth.

7. The computer-implemented process of claim 1 wherein each peer self reports its available upload bandwidth capacity.

8. The computer-implemented process of claim 1 further comprising periodically adjusting the first portion of the upload bandwidth capacity of each peer relative to the second portion of that peers upload bandwidth capacity to adapt to changes in a connection status of one or more other peers in the P2P network.

9. The computer-implemented process of claim 1 wherein an effective relative request time of any peer that pauses playback of the common media file is changed as a function of that peers current playback point relative to playback points of the other peers.

10. A computing device, comprising:
   a memory configured to store at least one program module; and
   a processing unit configured to execute the at least one program module to:
      determine an upload bandwidth capacity of each of a plurality of peer computing devices joined to a peer-to-peer (P2P) network;
      identify a request time when each peer computing device requested on-demand streaming of a common media file;
      for each peer, identifying a set of one or more downstream neighbor peers as those peers that requested the on-demand streaming of the common media file at a later time;
      direct streaming of media packets of the common media file to each peer for real-time playback of the media file at different times corresponding to the request times from a combination of:
         server transmission of streaming packets to one or more of the peers, and
         directing each peer to allocate a first portion of its upload bandwidth capacity to retransmit one or more received streaming media packets to one or more downstream neighbor peers; and
      direct each peer to allocate a second portion of its upload bandwidth capacity to one or more downstream neighbor peers, with that second portion being used to retransmit additional packets of the common media file in excess of those used to provide real-time playback.

11. The computing device of claim 10 further comprising on-demand peer selection of the requested media file from a plurality of available media files.

12. The computing device of claim 10 further comprising periodically adjusting the first portion of the upload bandwidth capacity of each peer relative to the second portion of that peers upload bandwidth capacity to adapt to changes in a connection status of one or more other peers in the P2P network.

13. The computing device of claim 10 wherein an effective relative request time of any peer that pauses playback of the common media file is changed as a function of that peers current playback point relative to playback points of the other peers.

14. The computing device of claim 10 further comprising evaluating each of the peer computing device in reverse order of their request times and allocating the second portion of each peers available upload bandwidth among a plurality of its downstream neighbor peers for filling a pre-fetching buffer of those peers with excess media packets of the common media file.

15. The computing device of claim 14 further comprising reducing allocations of the second portions of the upload bandwidth of the peers having earlier request times to particular downstream neighbor peers when a level of the pre-fetching buffer of those downstream neighbor peers reaches that of the peers which are allocating the upload bandwidth.

16. The computing device of claim 10 wherein directing each peer to allocate a second portion of its upload bandwidth capacity comprises:
   periodically directing each peer to allocate as much upload bandwidth as possible to its temporally closest downstream neighbor peer for filling a pre-fetching buffer of the temporally closest downstream neighbor peer with excess media packets of the common media file.

17. The computing device of claim 16 further comprising reallocating a portion of the second portion of the upload bandwidth of each peer to a next nearest downstream neighbor peer having a next closest request time when the level of the pre-fetching buffer of the nearest downstream neighbor peer reaches that of the peer which is allocating the upload bandwidth.

18. A computer-readable storage device having computer executable instructions stored therein, said instructions causing a computing device to execute a method comprising:
   identifying relative request times when each two or more peers in a peer-to-peer (P2P) network requested on-demand streaming of a common media file;
   directing streaming of media packets of the requested media file to each peer to enable streaming playback of the media file for each peer at different times corresponding to the relative request times from a combination of:
      server transmission of streaming packets to one or more of the peers, and
      using a first portion of an available upload bandwidth capacity of each peer to transmit one or more received streaming media packets to one or more other peers that requested on-demand streaming of the common media file at a later relative request time; and
   periodically directing one or more of the peers to use a second portion of its available upload bandwidth to transmit additional packets of the common media file to one or more of the peers that requested the common media file at later relative request times.

19. The computer-readable storage device of claim 18 wherein the first portion of the upload bandwidth capacity of each peer is periodically adjusted relative to the second portion of that peers upload bandwidth capacity to adapt to changes in a connection status of one or more other peers in the P2P network.

20. The computer-readable storage device of claim 18 wherein an effective relative request time of any peer that pauses playback of the common media file is changed as a function of that peers current playback point relative to playback points of the other peers.

* * * * *